US008958899B2

(12) United States Patent
Han

(10) Patent No.: US 8,958,899 B2
(45) Date of Patent: Feb. 17, 2015

(54) SINGLE-PEGGING-BASED PRODUCT SUPPLY CHAIN MANAGEMENT SYSTEM IN STAGED PRODUCTION PROCESS

(75) Inventor: Chang Youb Han, Yongin (KR)

(73) Assignee: NAEDAMCNC Corp., Ltd., Seongnam-si Gyeonggi-do (KR)

( * ) Notice: Subject to any disclaimer, the term of this patent is extended or adjusted under 35 U.S.C. 154(b) by 378 days.

(21) Appl. No.: 13/557,551

(22) Filed: Jul. 25, 2012

(65) Prior Publication Data
US 2013/0325157 A1    Dec. 5, 2013

(30) Foreign Application Priority Data

Jun. 1, 2012  (KR) .......................... 10-2012-0059164

(51) Int. Cl.
*G06F 19/00*    (2011.01)
*G06Q 10/08*    (2012.01)
(52) U.S. Cl.
CPC .................................. *G06Q 10/087* (2013.01)
USPC ................................ 700/106; 700/97; 700/99
(58) Field of Classification Search
CPC ...................................................... G06Q 10/087
USPC ............................................... 700/97, 99, 106
See application file for complete search history.

(56) References Cited

U.S. PATENT DOCUMENTS

| | | | | |
|---|---|---|---|---|
| 6,701,201 | B2 * | 3/2004 | Hegde et al. ................... | 700/107 |
| 7,373,212 | B2 * | 5/2008 | Lokowandt .................... | 700/101 |
| 7,426,418 | B2 * | 9/2008 | Kern ................................ | 700/99 |
| 7,606,743 | B2 * | 10/2009 | Orzell et al. .................... | 705/28 |
| 8,565,924 | B2 * | 10/2013 | Godard .......................... | 700/282 |
| 2003/0208392 | A1 * | 11/2003 | Shekar et al. ...................... | 705/8 |
| 2003/0233262 | A1 * | 12/2003 | Chorely et al. .................... | 705/8 |
| 2005/0177465 | A1 * | 8/2005 | Orzell et al. .................... | 705/28 |
| 2005/0256597 | A1 * | 11/2005 | Chao et al. ........................ | 700/96 |
| 2007/0050233 | A1 * | 3/2007 | Doerfler et al. ................. | 705/10 |

(Continued)

OTHER PUBLICATIONS

"Material Requirements Planning in Microsoft Dynamics GP", Microsoft Corp, 2007.*
"Overview of Oracle ASCP Supply-Demand Pegging", Nair, Rapidflow Apps Inc., Date Unknown.*

(Continued)

*Primary Examiner* — Michael D Masinick
(74) *Attorney, Agent, or Firm* — Li&Cai Intellectual Property (USA) Office

(57) ABSTRACT

Provided is a single-pegging-based product supply chain management system, which manages a supply chain of products with respect to the demand for end products in a continuous process of supplying products to produce other products, represents the supply chain of each product as a node, and converts a multi-pegging process comprising a plurality of nodes in each stage into single-pegging graphs each comprising a single node in each stage by division. The system extracts a certain single-pegging graph from a multi-pegging graph in each stage, excludes the supply amount of the single-pegging graph extracted from the multi-pegging graph, and repeats the process of extracting another single-pegging graph, thus generating a group of single-pegging graphs. According to the system, since the supply chain is represented through only one correlation, it is possible to intuitively show the supply planning to allow a user to easily establish production planning and increase its accuracy.

6 Claims, 7 Drawing Sheets

(56) References Cited

U.S. PATENT DOCUMENTS

| | | | |
|---|---|---|---|
| 2007/0288111 A1* | 12/2007 | Kern | 700/99 |
| 2009/0157474 A1* | 6/2009 | Laur | 705/10 |
| 2009/0307026 A1* | 12/2009 | Ervolina et al. | 705/7 |
| 2010/0332007 A1* | 12/2010 | Godard | 700/102 |
| 2013/0325157 A1* | 12/2013 | Han | 700/97 |

OTHER PUBLICATIONS

"Defining Supply Chain Plans", Oracle Advanced Supply Chain Planning Implementation and Users Guide, Release 12.1, 2011.*

"Grouping, Pegging, and Distribution (GPD)", Minney et al, ASUG Annual Conference and Vendor Fair, May 18-21, 2003.*

\* cited by examiner (a)

| ITEM | CONDITION |
|---|---|
| DEMAND AMOUNT | A1 = 30<br>A2 = 70 |
| COMPONENT ATIO<br>(UNIT RODUCTION<br>CONDITION) | A : B = 1 : 2<br>B : C = 1 : 2<br>C : D = 1 : 3<br>D : E = 1 : 4 |
| SUPPLY CAPACITY<br>(Capacity) | B1 ≤ 60,  B2 ≤ 200<br>C1 ≤ 40,  C2 ≤ 250,  C3 ≤ 160<br>D1 ≤ 360,  D2 ≤ 360,  D3 ≤ 500<br>E1 ≤ 4000 |

SINGLE-PEGGING-BASED PRODUCT SUPPLY CHAIN MANAGEMENT SYSTEM IN STAGED PRODUCTION PROCESS

CROSS-REFERENCE TO RELATED APPLICATION

This application claims priority to and the benefit of Korean Patent Application No. 10-2012-0059164, filed on Jun. 1, 2012, the disclosure of which is incorporated herein by reference in its entirety.

BACKGROUND

1. Field of the Invention

The present invention relates to a single-pegging-based product supply chain management system, which manages a supply chain of products with respect to the demand for end products in a continuous process (hereinafter referred to as a staged production process) of supplying products to produce other products.

Moreover, the present invention relates to a single-pegging-based product supply chain management system, which represents a supply chain of each product as a node and converts a multi-pegging process (graph) comprising a plurality of nodes in each stage into single-pegging graphs each comprising a single node in each stage by division.

2. Discussion of Related Art

In general, the purpose of supply chain management is to establish and execute optimal production planning to meet the demand for end products (such as a product, quantity, delivery date, etc.), thus achieving inventory reduction and customer satisfaction.

For the supply chain management, it is necessary to connect the flows of materials, products, and costs, which occur in the overall business activities such as purchase, supply, production, sales, etc., to each other thus identifying the flows as a single flow of information. Moreover, it is necessary to identify possible problems and improvement points by analyzing the flow of information. According to circumstances, it is necessary to allow a system to automatically cope with the possible problems.

In particular, when a manufacturer proceeds with production or establishes production planning, the manufacturer is subject to restrictions on the process capacity of equipment, the procurement capacity from part suppliers, etc. and may establish the production planning based on these restrictions. That is, the production planning is established based on the restrictions on the process capacity of production equipment, etc. Moreover, there are resources used to produce certain semi-finished products or finished products in the production process. As such, the resources related to the production capacity refers to supply capacity, which serves as a restriction on the modeling of the amount of resources used and the establishment of production planning when the manufacturer is to produce products.

When the above-described supply chain management system is established, it is possible to immediately establish production planning by predicting the demand for end products by consumers and to place orders with suppliers for parts by predicting the supply of resources such as parts. That is, it is possible to supply products that consumers want on desired dates by immediate production based on the timely supply of parts and the process capacity of production equipment. Thus, it is possible to increase consumer satisfaction, reduce costs, and ensure competitiveness by minimizing inventory.

Here, it is necessary to establish production planning for each production line based on the estimated demand by reflecting various restriction conditions on the production. However, it is very complex and difficult to establish production planning based on a variety of restriction conditions such as the number of production lines, the number of resources used, the number of part suppliers, etc. which are to be considered in a typical manufacturing site.

To this end, the production planning is established based on a linear programming algorithm (LPA) in which each restriction condition is represented by a formula. That is, a solution is found by determining the restriction condition on the production and the target amount (or demand) of products based on the linear programming algorithm. Accordingly, in order to produce the target amount of end products, the amount of products to be produced on each production line or the amount of resources such as parts required for the production is calculated. Based on this calculation result, a supply chain manager establishes production planning in a particular supply chain.

As shown in FIG. 1, the result may be represented in the form of a hierarchical directed graph (or multi-pegging graph) by the linear programming algorithm. In FIG. 1, A represents a group of end products, B represents products (or intermediate products) for producing the end products of A, and C represents products (or supply products) to be supplied to produce the products of B. The result has an output (or input) at each node as a solution (the output is not shown in FIG. 1), and thus the production planning can be established based on the output.

That is, each node of FIG. 1 refers to the product (or part), and each link connects a production process or a product (or part) to be supplied to produce a corresponding product (or part). Accordingly, A refers to the final demand, and it is possible to identify subordinate products for producing the end products of A by reversely following the flow (link) from A. Moreover, it is possible to identify the amount of products (or parts) required for the final demand A in each stage.

However, in the graph (or multi-pegging graph) according to the prior art as shown in FIG. 1, the connection of the links is complex, and thus it is not easy to cross check the links on the upstream or downstream. In particular, when there are hundreds and thousands of parts or scores of manufacturing processes, the multi-pegging graph becomes very complex.

In other words, according to the conventional method of establishing production planning, a solution is found by applying the linear programming algorithm to the multiple stages of semi-finished products (or intermediate products) to produce finished products (or end products). However, in the event of a failure, it is very difficult to determine at which stage the failure occurs, since the production planning solution is in the form of a multi-pegging graph.

Accordingly, it is difficult for the supply chain manager to analyze the multi-pegging graph as the result by the linear programming algorithm, and it takes a lot of time to establish production planning based on the multi-pegging graph.

SUMMARY OF THE INVENTION

The prevent invention has been made in an effort to solve the above-described problems associated with the prior art, and an object of the present invention is to provide a single-pegging-based product supply chain management system, which represents the supply chain of each product as a node and converts a multi-pegging process (graph) comprising a plurality of nodes in each stage into single-pegging graphs each comprising a single node in each stage by division.

Another object of the present invention is to provide a single-pegging-based product supply chain management system, which extracts a certain single-pegging graph from a multi-pegging graph in each stage, excludes the supply amount of the single-pegging graph extracted from the multi-pegging graph, and repeats the process of extracting another single-pegging graph, thus generating a group of single-pegging graphs.

According to an aspect of the present invention for achieving the above objects, there is provided a single-pegging-based product supply chain management system, which manages a supply chain of products with respect to the demand for end products in a continuous process (i.e., a staged production process) of supplying products to produce other products, the system comprising: a multi-pegging input unit which receives a graph (hereinafter referred to as a multi-pegging graph) representing a production process of products as a series of stages, in which each stage comprises at least one node representing a product of a specific supplier, nodes in the same stage represent the same products, and each node is connected to at least one lower level node by a link; a supply calculation unit which receives a condition (hereinafter referred to as a unit production condition), which represents the condition on the amount of products at a lower level required to produce a unit of a product at a higher level, and a demand amount for end products and calculates a supply amount of each of all nodes in the multi-pegging graph; and a single-pegging generation unit, which generates a graph group (hereinafter referred to as a single-pegging graph group) composed of a plurality of single-pegging graphs from the multi-pegging graph, in which the single-pegging graph has the same stages as the multi-pegging graph, each stage of the single-pegging graph has only one node, the total supply amount of the same nodes in the single-pegging graph group is the same as that of the same nodes in the multi-pegging graph.

The supply calculation unit may calculate the supply amount based on a linear programming algorithm (LPA).

The single-pegging generation unit may extract a single-pegging graph from the multi-pegging graph, exclude the supply amount of each node in the extracted single-pegging graph from the supply amount of each node in the multi-pegging graph, and extract another single-pegging graph from the remaining multi-pegging graph.

The supply amount of the extracted single-pegging graph may be calculated based on a node (hereinafter referred to as a single node), which is linked neither to more than two higher level nodes nor to more than two lower level nodes.

If there are several single nodes, the supply amount may be determined based on the single node in the lowest stage.

The supplier may be identified based on at least one of a product, a location, and a date.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 shows an example of restriction conditions in accordance with an exemplary embodiment of the present invention;

DETAILED DESCRIPTION OF EXEMPLARY EMBODIMENTS

Figure 1:
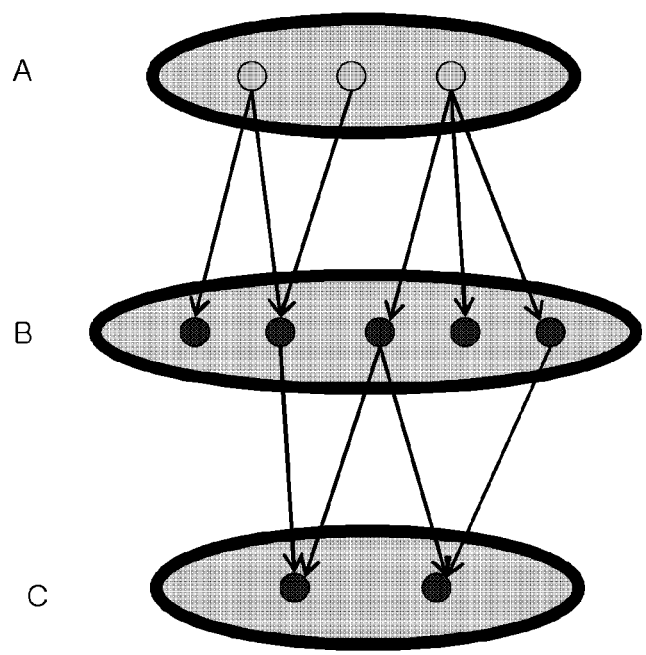
FIG. 1 shows an example of a multi-pegging graph for production planning according to a prior art.

Hereinafter, exemplary embodiments of the present invention will be described in detail with reference to the accompanying drawings. Like reference numerals in the drawings denote like elements, and thus repeated descriptions will be omitted.

First, the configuration of the entire system for implementing the present invention will be described with reference to FIGS. 2A and 2B.

Figure 2:
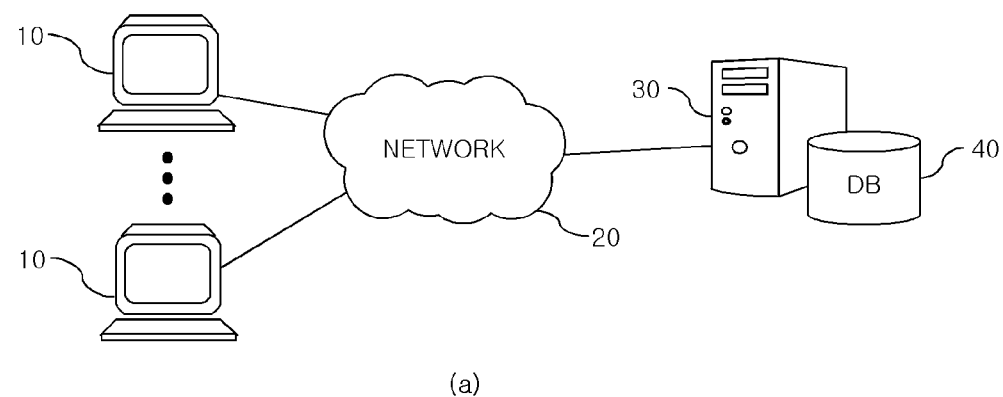
FIGS. 2A and 2B are schematic diagrams showing the configuration of the entire system for implementing the present invention.
Figure 2:
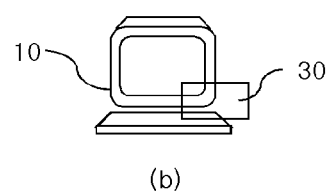

As shown in FIGS. 2A and 2B, a single-pegging graph-based product supply chain management system in accordance with an exemplary embodiment of the present invention may be implemented as a server system over a network or a program system in a computer terminal.

As shown in FIG. 2A, an example of the entire system for implementing the present invention comprises a user terminal 10 and a single-pegging-based product supply chain management system 30, which are connected to each other through a network 20. The entire system may further comprise a database 40 for storing necessary data.

The user terminal 10 is a typical computing terminal such as PC, notebook, netbook, PDA, mobile, etc. that a user such as a supplier, a supply chain manager, etc. uses. The user transmits a production capacity of products, a demand amount for products, etc. to the supply chain management system 30 using the user terminal 10 or requests the supply chain management system 30 to establish production planning.

The single-pegging-based product supply chain management system 30 is a typical server and is connected to the network 20 to provide services such as providing a definition tool for defining the production capacity of products, the demand amount for products, etc., receiving the final demand and various restriction conditions, and displaying the result of the production planning for the demand to be referenced by the user.

Meanwhile, the supply chain management system 30 may be implemented as a web server or web application server that provides each of the above services to a web page on the Internet.

The database 40 is a typical storage medium for storing data required by the supply chain management system 30 and stores the demand amount, the manufacturing processes, the restriction conditions on the procurement of parts, etc.

As shown in FIG. 2B, another example of the entire system for implementing the present invention comprises a single-pegging-based product supply chain management system 30 in the form of a program installed in a computer terminal 10. That is, the functions of the supply chain management system 30 are implemented as a computer program and installed in the computer terminal 10 to receive a production capacity of products, a demand amount for products, etc., from an input device of the computer terminal 10 by a user or output production planning established in the form of a graph through an output device of computer terminal 10. Meanwhile, data required by the supply chain management system 30 is stored in a storage space such as a hard disk of the computer terminal 10 and used.

As still another example, a single-pegging-based product supply chain management system 30 may be configured as a micro-program to be implemented as a dedicated IC chip driven by a microprocessor or may be implemented as an electronic circuit such as an application-specific integrated circuit (ASIC), etc. That is, the single-pegging-based product supply chain management system 30 may be configured in the form of software or in the form of an electronic circuit comprising FPGA chips or several circuit elements. Otherwise, the single-pegging-based product supply chain management system 30 may be implemented as other possible forms. However, the single-pegging-based product supply chain management system 30 implemented in the computer terminal 10 will be described for the sake of convenience.

Next, the configuration of the single-pegging-based product supply chain management system in accordance with an exemplary embodiment of the present invention will be described in more detail with reference to of FIG. 3.

Figure 3:
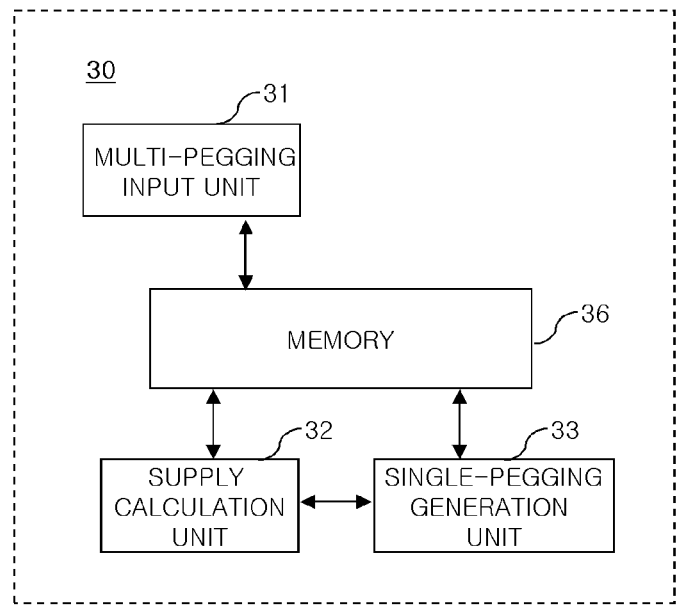
FIG. 3 is a block diagram of a single-pegging graph-based product supply chain management system in accordance with an exemplary embodiment of the present invention.

As shown in FIG. 3, the single-pegging-based product supply chain management system 30 in accordance with an exemplary embodiment of the present invention comprises a multi-pegging input unit 31, a supply calculation unit 32, and a single-pegging generation unit 33. The single-pegging-based product supply chain management system 30 may further comprise a memory 36 for storing data.

The multi-pegging input unit 31 receives a graph (hereinafter referred to as a multi-pegging graph) representing a production process of products as a series of stages. Here, each stage comprises at least one node representing a product of a specific supplier. Moreover, nodes in the same stage represent the same products, and each node is connected to at least one lower level node by a link.

Figure 4:
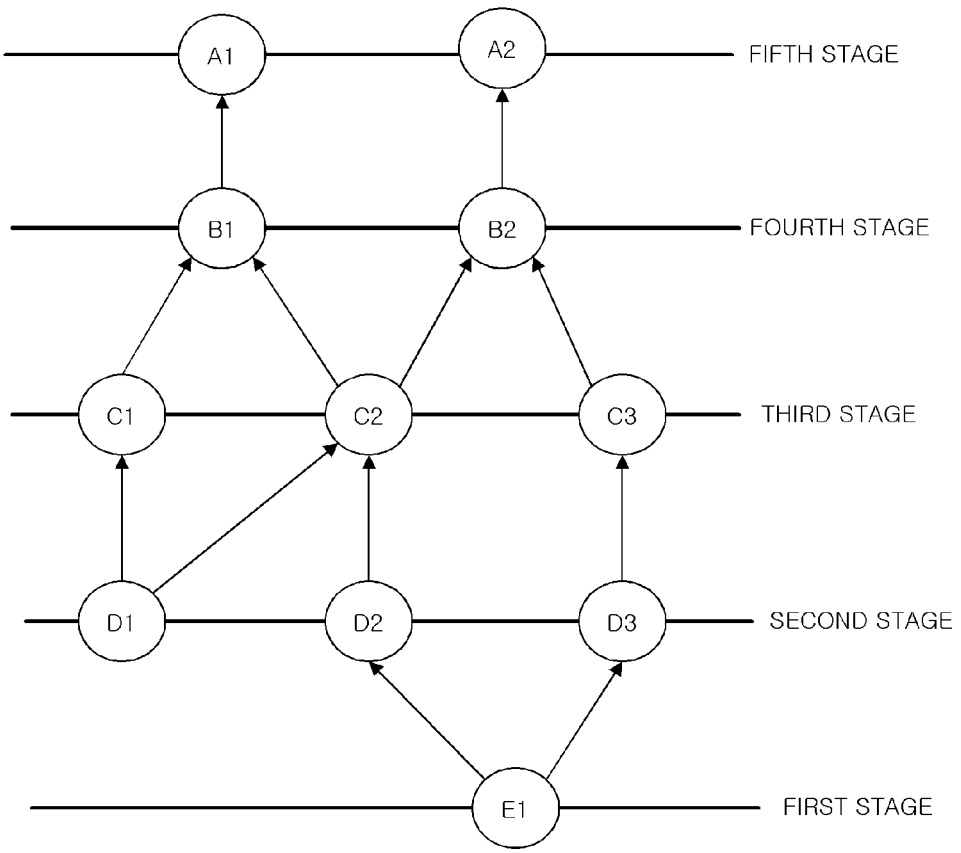
FIG. 4 shows an example of a multi-pegging graph in accordance with an exemplary embodiment of the present invention.

As shown in FIG. 4, the multi-pegging graph is a directed graph comprising nodes and links, and the nodes are divided into layers (or stages). The lowest level node is the lowest stage, and the highest level node is the highest phase. A node at a lower level is connected to a node at the next higher level by a link. The direction of the link always goes from the lower level to the higher level.

It can be seen from the example of FIG. 4 that nodes are A1, A2, B1, B2, . . . , and E1 and links are <E1, D2>, <E1, D3>, <D1, C1>, <D1, C2>, . . . <B1, A1>, and <B2, A2>. <a, b> represents a directed link from node a to node b. Here, node a is called a source node, and node b is called a destination node.

It can be seen from the example of FIG. 4 that the multi-pegging graph is a graph consisting of a total of five (5) stages, in which a first stage includes node E1, a second stage includes nodes D1, D2, and D3, a third stage includes nodes C1, C2, and C3, and so on. Thus, fifth and fourth stages may have a plurality of nodes such as two nodes, the third and second stages may have three nodes, and so on. In particular, each stage of the multi-pegging graph should consist of at least one node.

The node represents a resource such as an end product of a specific supplier, a part, an intermediate product, a material, etc. The end product, the part, etc. will be collectively referred to as a "product". The node will also be referred to as the product so as to be used in a mixed manner. That is, node A1 is used as product A1 in a mixed manner.

Meanwhile, the nodes of the multi-pegging graph are distinguished by suppliers and products. That is, if nodes have different suppliers and products, the corresponding nodes are classified into different nodes. Preferably, the supplier may be specified into a site (company, or supply center), date, etc. If the supply dates are different, even though the sites are the same, the suppliers are identified as different suppliers.

Moreover, the nodes in the same stage represent the same product. In the example of FIG. 4, nodes A1 and A2 in the fifth stage are the same product, but the suppliers of node A1 and A2 are different.

That is, product A1 also has the meaning of "product A" produced by supplier (or site) A1. Thus, node A1 is used as supplier (or site) A1 in a mixed manner.

Moreover, the link in the multi-pegging graph means that a product of a source node is supplied to produce a product of a destination node. Here, the product of the source node will be referred to as a supply product (or supply node), and the product of the destination node will be referred to as a production product (or production node).

It can be seen from the example of FIG. 4 that product B1 should be supplied to produce product A1 and products D1 and D2 should be supplied to produce product C2. Here, products D1 and D2 are substantially the same and supplied by different suppliers, and thus either product D1 or product D2 may be supplied to produce product C2.

Next, the supply calculation unit 32 will be described. The supply calculation unit 32 receives a condition (hereinafter referred to as a unit production condition), which represents the condition on the amount of products at a lower level required to produce a unit of a product at a higher level, and a demand amount for end products and calculates the supply amount of each of all nodes of the multi-pegging graph.

As shown in FIG. 5, the supply calculation unit 32 receives a demand amount for end products, a component ratio (or unit production condition), etc.

The demand amount is the demand for end products. That is, the demand amount is the demand (or supply) for the highest level node of the multi-pegging graph. In the example of FIG. 4, the end products are A1 and A2, and thus the demand amount refers to the demand for products A1 and A2.

The unit production condition refers to the condition on the amount of products at a lower level required to produce a unit of a product at a higher level. It can be seen from the example of FIG. 5 that two products B are required to produce one product A (or products A1, A2) (A:B=1:2), and three products D are required to produce one product C (C:D=1:3).

The supply capacity refers to a maximum supply amount supplied by each supplier. The example of FIG. 5 shows that supplier B1 can supply a maximum of sixty (60) products B, and supplier D3 can produce a maximum of five hundred (500) products D.

The supply amount of products to be supplied at each node in the multi-pegging graph of FIG. 4 is calculated based on the above conditions as restrictions. Here, the supply calculation unit 32 calculates the supply amount based on a linear programming algorithm (LPA).

The conditions of FIG. 5 correspond to those in the linear programming algorithm. That is, the supply amount for each node is calculated based on the corresponding conditions as restrictions according to the linear programming algorithm. The linear programming algorithm is a well known technology, and thus a detailed description thereof will be omitted.

Figure 6:
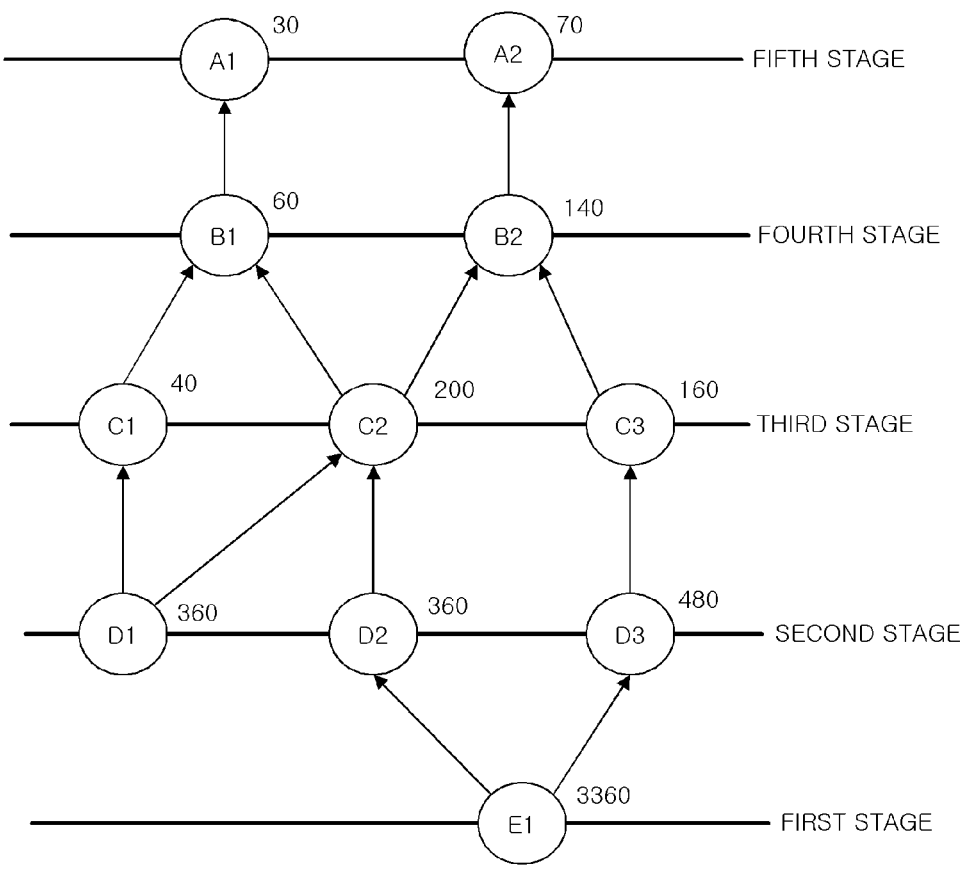
FIG. 6 shows an example of a multi-pegging graph showing on which supply quantities are shown in accordance with an exemplary embodiment of the present invention.

An example of the supply amount for each node in the multi-pegging graph, calculated by the supply calculation unit 32 based on the input conditions, is shown in FIG. 6. The numeral shown at the upper right of each node in FIG. 6 represents the supply amount.

The multi-pegging graph as shown in FIG. 6 has a problem that, given any one node (product), it is impossible to clearly identify the supply-production relationship between a higher level node and a lower level node of the corresponding node. For example, given node C2, node C2 has higher level nodes B1 and B2. Product C2 (produced at site C2) can be supplied to all suppliers B1 and B2, but it is impossible to clearly identify the amount of products supplied.

Moreover, node C2 has lower level nodes D1 and D2. Thus, supplier C2 can be supplied with products D by all suppliers D1 and D2, but it is impossible to identify the amount of products supplied by each supplier.

Next, the single-pegging generation unit 33 will be described.

The single-pegging generation unit 33 generates a graph group (hereinafter referred to as a single-pegging graph group) composed of a plurality of single-pegging graphs from the multi-pegging graph. Here, the single-pegging graph has the same stages as the multi-pegging graph, each stage of the single-pegging graph has only one node, and the total supply amount of the same nodes in the single-pegging graph group is the same as that of the same nodes in the multi-pegging graph.

Figure 7:
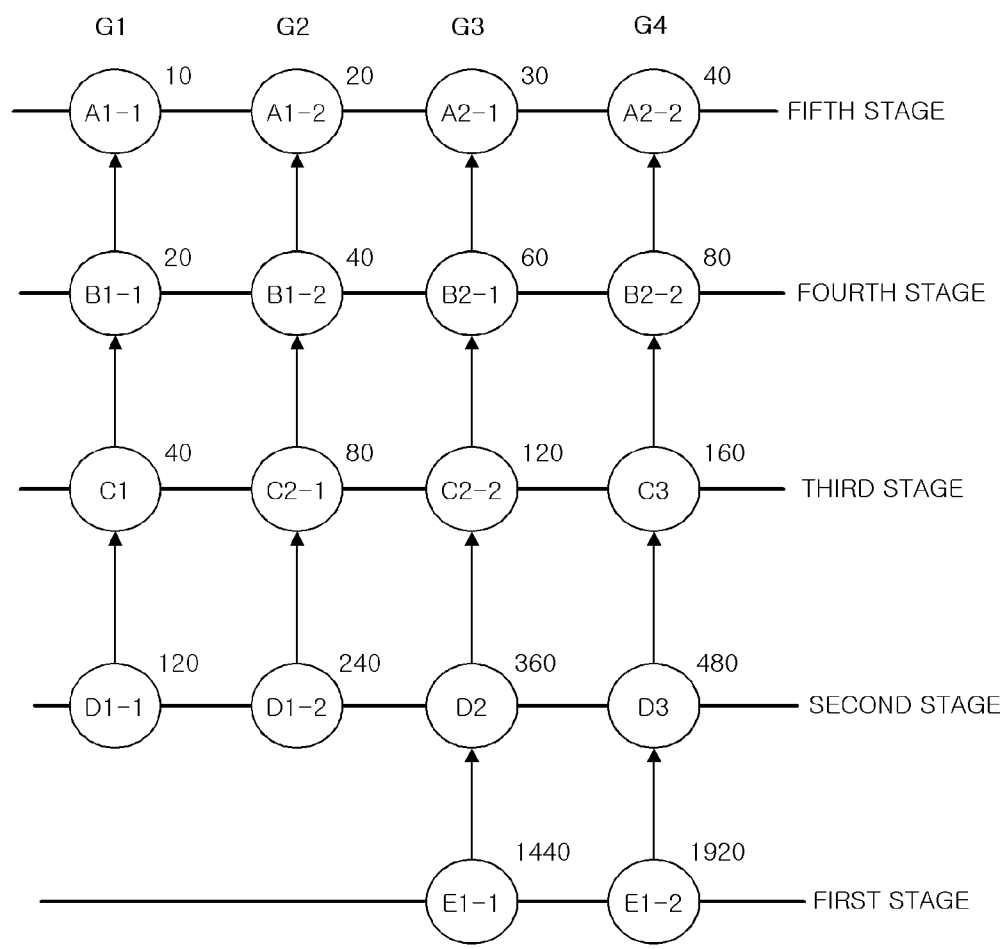
FIG. 7 shown an example of a single-pegging graph group extracted from the multi-pegging graph of FIG. 6 in accordance with an exemplary embodiment of the present invention.

As shown in FIG. 7, the single-pegging graph has the same stages as the multi-pegging graph. However, each stage of the single-pegging graph has only one node, unlike the multi-pegging graph.

In the example of FIG. 7, a total of four (4) single-pegging graphs form a single-pegging graph group. That is, the single-pegging graph group has single-pegging graphs G1, G2, G3, and G4. In the example of FIG. 7, nodes with a dash represent nodes of the same supplier. For example, nodes A1-1 and A1-2 all represent the same supplier A1, and nodes B1-1 and B1-2 all represent the same supplier B1.

Moreover, the total supply amount of the same nodes in the single-pegging graph group is the same as that of the same nodes in the multi-pegging graph. In the example of FIG. 7, the supply amount (80) of node C2-1 in G2 and the supply amount (120) of node C2-2 in G3 are the same as the supply amount (200) of C2 in FIG. 6.

In the single-pegging graph as shown in FIG. 7, given any one node (product), it is possible to clearly identify the supply-production relationship between a higher level node and a lower level node of the corresponding node.

For example, given node C2, node C2 is divided into node C2-1 in G2 and node C2-2 in G3. Node C2-1 has higher level node B1-2 and lower level node D1-2. Node C2-2 has higher level node B2-1 and lower level node D2. Thus, it can be clearly seen that supplier C2 supplies forty (40) products C to supplier B1 and sixty (60) products C to supplier B2. Moreover, it can be clearly seen that supplier C2 is supplied with two hundred forty (240) products D by supplier D1 and supplied with three hundred sixty (360) products D by supplier D2.

That is, according to the present invention, it is possible to easily identify the problem of the production planning established based on the linear programming algorithm by analyzing the production planning with the single-pegging graph once again. As a result, it is possible to solve the problem by analyzing the production planning, thus increasing the accuracy of the production planning. Moreover, it is possible to achieve inventory reduction and customer satisfaction at the same time.

Meanwhile, the single-pegging generation unit 33 extracts a single-pegging graph from the multi-pegging graph, excludes the supply amount of each node in the extracted single-pegging graph from the supply amount of each node in the multi-pegging graph, and extracts another single-pegging graph from the remaining multi-pegging graph.

Preferably, the single-pegging generation unit 33 extracts a graph comprising all nodes on a path from the highest level nodes to the nodes (hereinafter referred to as leaf nodes) which are not connected to lower level nodes as a single-pegging graph from the multi-pegging graph.

In the multi-pegging graph of FIG. 6, the path from the highest level node A1 to the leaf node D1 is A1-B1-C1-D1. The single-pegging graph including these nodes extracted from the multi-pegging graph is the same as single-pegging graph G1 of FIG. 7.

Next, a method of determining the supply amount of the extracted single-pegging will be described.

The supply amount of the single-pegging graph is calculated based on a node (hereinafter referred to as a single node), which is linked neither to more than two higher level nodes nor to more than two lower level nodes. Here, if there are several single nodes, the supply amount is determined based on the single node in the lowest stage.

That is, in the determination of the supply amount of the extracted single-pegging graph, the supply amount of each of the remaining nodes is determined based on the supply amount of the single node. The condition of determining the supply amount is based on the above-described component ratio (or the unit production condition).

In the example of FIG. 6, the single node in the lowest stage among the nodes in the path of A1-B1-C1-D1 is C1. Thus, the supply amount of each of the remaining nodes is determined based on node C1. The supply amount of node C1 is determined as the supply amount of the multi-pegging graph, and thus the supply amount is determined as forth (40). Then, the number of remaining nodes is determined based on the component ratio of FIG. 5. It can be seen from the component ratio of FIG. 5 that D2:C2:B1:A1 is 12:4:2:1. Accordingly, the supply amount of nodes D2, C2, B1, and A1 of the single-pegging graph is 120, 40, 20, and 10, respectively. This result is the same as G1 of FIG. 7.

Then, the single-pegging graph extracted from the multi-pegging graph is excluded. Here, the supply amount of each node in the extracted single-pegging graph is excluded from the supply amount of each node in the multi-pegging graph.

The supply amount of single-pegging graph G1 of FIG. 1 is excluded from the multi-pegging graph of FIG. 6, and the node whose supply amount is 0 is deleted. As a result, the resulting multi-pegging graph is as shown in FIG. 8A.

Figure 8:
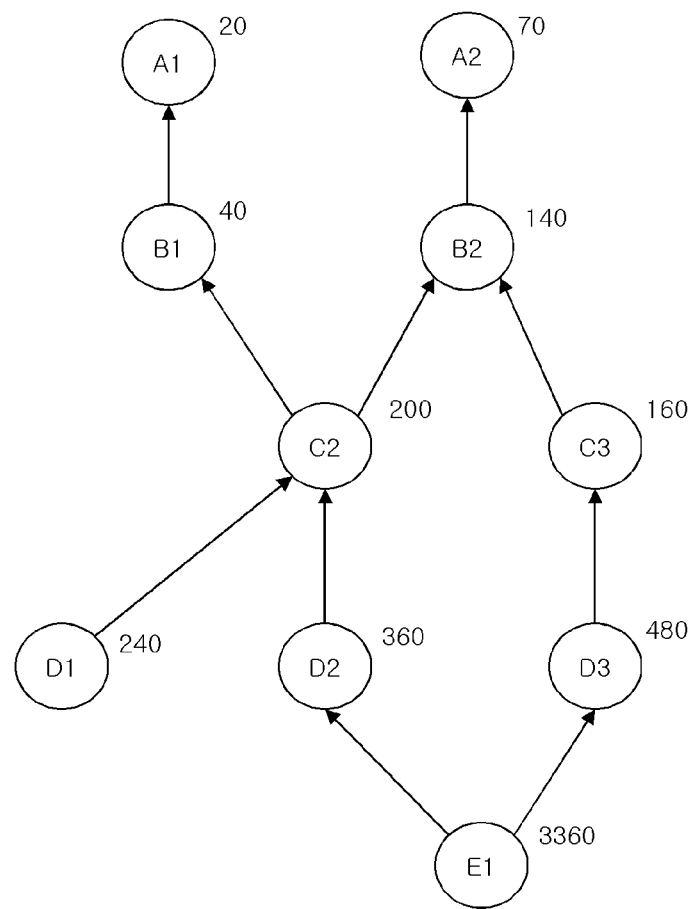
FIGS. 8A and 8B show examples of an intermediate multi-pegging graph generated when a single-pegging graph is extracted from a multi-pegging graph of in accordance with an exemplary embodiment of the present invention.

Then, the foregoing process is repeated on the multi-pegging graph of FIG. 8A.

Figure 8B:
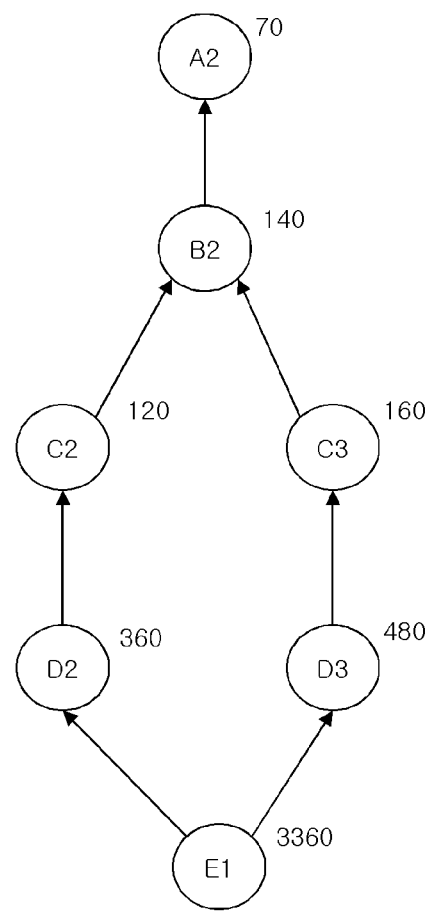

The next single-pegging graph extracted is A1-B1-C2-D1, and the supply amount of the nodes is 20, 40, 80, and 240, respectively. This single-pegging graph corresponds to G2 of FIG. 7. When single-pegging graph G2 of FIG. 7 is excluded from the multi-pegging graph of FIG. 8A, the resulting multi-pegging graph is as shown in FIG. 8B.

Subsequently, when the foregoing process is repeated on the multi-pegging graph of FIG. 8B, it is possible to extract single-pegging graphs G3 and G4.

As described above, according to the single-pegging-based product supply chain management system of the present invention, since the supply chain of products is represented through only one correlation, it is possible to intuitively show the supply planning of products to allow the user to easily establish the production planning, thus reducing the time required to establish the planning.

Moreover, according to the single-pegging-based product supply chain management system of the present invention, it is possible to prevent the occurrence of problems during product supply, and thus it is possible to establish optimal production planning.

That is, according to the present invention, it is possible to easily identify the problem of the production planning established based on the linear programming algorithm by analyzing the production planning with the single-pegging graph once again, and thus it is possible to solve the problem by analyzing the production planning, thus increasing the accuracy of the production planning. As a result, it is possible to achieve inventory reduction and customer satisfaction at the same time.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A single-pegging-based product supply chain management system, which manages a supply chain of products with respect to the demand for end products in a continuous process (i.e., a staged production process) of supplying products to produce other products, the system comprising:

a multi-pegging input unit which receives a graph (hereinafter referred to as a multi-pegging graph) representing a production process of products as a series of stages, in which each stage comprises at least one node representing a product of a specific supplier, nodes in the same stage represent the same products, and each node is connected to at least one lower level node by a link;

a supply calculation unit which receives a condition (hereinafter referred to as a unit production condition), which represents the condition on the amount of products at a lower level required to produce a unit of a product at a higher level, and a demand amount for end products and calculates a supply amount of each of all nodes in the multi-pegging graph; and a single-pegging generation unit, which generates a graph group (hereinafter referred to as a single-pegging graph group) composed of a plurality of single-pegging graphs from the multi-pegging graph, in which the single-pegging graph has the same stages as the multi-pegging graph, each stage of the single-pegging graph has only one node, the total supply amount of the same nodes in the single-pegging graph group is the same as that of the same nodes in the multi-pegging graph.

2. The system of claim 1, wherein the supply calculation unit calculates the supply amount based on a linear programming algorithm (LPA).

3. The system of claim 1, wherein the single-pegging generation unit extracts a single-pegging graph from the multi-pegging graph, excludes the supply amount of each node in the extracted single-pegging graph from the supply amount of each node in the multi-pegging graph, and extracts another single-pegging graph from the remaining multi-pegging graph.

4. The system of claim 3, wherein the supply amount of the extracted single-pegging graph is calculated based on a node (hereinafter referred to as a single node), which is linked neither to more than two higher level nodes nor to more than two lower level nodes.

5. The system of claim 4, wherein, if there are several single nodes, the supply amount is determined based on the single node in the lowest stage.

6. The system of claim 1, wherein the supplier is identified based on at least one of a product, a location, and a date.

* * * * *